United States Patent Office 3,494,887
Patented Feb. 10, 1970

---

3,494,887
DIESTERS OF CERTAIN DIALKANOLAMINES AND DI(LOWER) ALKYLHYDROXYPHENYLALKANOIC ACIDS
Martin Dexter, Briarcliff Manor, John D. Spivack, Spring Valley, and David H. Steinberg, Bronx, N.Y., assignors to Geigy Chemical Corporation, Greenburgh, N.Y., a corporation of Delaware
No Drawing. Original application Mar. 24, 1964, Ser. No. 354,464, now Patent No. 3,441,575. Divided and this application Dec. 1, 1967, Ser. No. 711,815
Int. Cl. C07c 69/76
U.S. Cl. 260—473      2 Claims

ABSTRACT OF THE DISCLOSURE

Esters of di(lower)alkylhydroxyphenyl alkanoic acid formed with alcohols containing the group $$-\text{N}-$$
$$\quad |$$
$$\quad \text{A}$$

wherein A is alkyl are useful in the stabilization of organic material normally subject to oxidative deterioration. Material stabilized by the subject compounds includes polyolefins, such as polypropylene.

CROSS REFERENCES TO RELATED APPLICATIONS

The present application is a divisional application of Ser. No. 354,464 filed Mar. 24, 1964, now U.S. Patent No. 3,441,575, which is a continuation-in-part of Ser. No. 276,192 filed Apr. 29, 1963, now abandoned, which is a continuation-in-part of Ser. No. 164,618 filed Jan. 5, 1962, now abandoned, which in turn is a continuation-in-part of Ser. No. 148,738 filed Oct. 30, 1961, now abandoned. Copending applications Ser. No. 711,816 filed Dec. 1, 1967 and Ser. No. 711,817 filed Dec. 1, 1967 are also divisional applications of Ser. No. 354,464 filed Mar. 24, 1964.

Application Ser. No. 354,434 filed Mar. 24, 1964, now U.S. 3,330,859 is a continuation-in-part of Ser. No. 276,-192.

Application Ser. No. 439,076 filed Mar. 11, 1965, now U.S. 3,285,855 is a continuation-in-part of Ser. No. 164,-618.

Application Ser. No. 424,852 filed June 11, 1965, now U.S. 3,277,148 and Ser. No. 413,996 filed Nov. 25, 1964, now U.S. 3,277,152 are continuation-in-part applications of Ser. No. 276,192.

THE INVENTION

This invention pertains to novel carboxylic acid esters which are useful in the stabilization of organic materials normally subject to oxidative deterioration.

Materials which are stabilized according to the present invention include synthetic organic polymeric substances such as vinyl resins formed from the polymerization of vinyl halides or from the copolymerization of vinyl halides with unsaturated polymerizable compounds, e.g., vinyl esters, $\alpha,\beta$-unsaturated acids, $\alpha,\beta$-unsaturated esters, $\alpha,\beta$-unsaturated ketones, $\alpha,\beta$-unsaturated aldehydes and unsaturated hydrocarbons such as butadienes and styrene; poly-$\alpha$-olefins such as polyethylene, polypropylene, polybutylene, polyisoprene and the like, including copolymers of poly-$\alpha$-olefins; polyurethanes such as are prepared from polyols and organic polyisocyanates; polyamides such as polyhexamethylene adipamide; polyesters such as polymethylene terephthalates; polycarbonates; polyacetols; polystyrene, polyethyleneoxide; and copolymers such as those of high impact polystyrene containing copolymers of butadiene and styrene and those formed by the copolymerization of acrylonitrile, butadiene and/or styrene. Other materials stabilized according to the present invention includes lubricating oil of the aliphatic ester type, e.g., di-(2-ethylhexyl)azelate, pentaerythritol tetracaproate and the like; animal and vegetable derived oils, e.g., linseed oil, tallow, fat, lard, peanut oil, cod liver oil, castor oil, palm oil, corn oil, cotton seed oil and the like; hydrocarbon material such as gasoline, both natural and synthetic, diesel oil, mineral oil, fuel oil, cutting fluids, waxes resins and the like; fatty acids; soaps; and the like.

In general the stabilizers of this invention are employed from about 0.005% to about 10% by weight of the stabilized composition. A particularly advantageous range for polyolefins such as polypropylene is from about 0.05% to about 5%, especially from about 0.1% to about 1%.

The compounds of the present invention are represented by the formula:

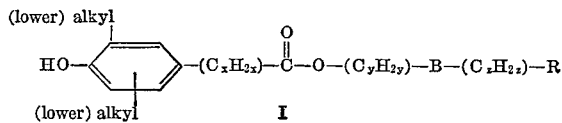

I wherein
$x$ has a value of from 0 to 6 inclusively,
each of $y$ and $z$ independently has a value of from 2 to 20 inclusively,
R is hydrogen, hydroxy, alkanoyloxy or the group

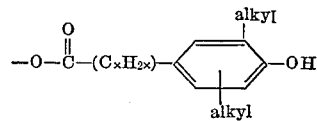

where
$x$ is as defined above and
B is a divalent sulfur atom, a divalent oxygen atom, or the divalent group $$-\text{N}-$$
$$\quad |$$
$$\quad \text{A}$$

in which A is alkyl or alkanoyl.

Particularly useful compounds falling within the above class are those of the formula:

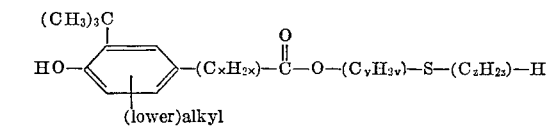

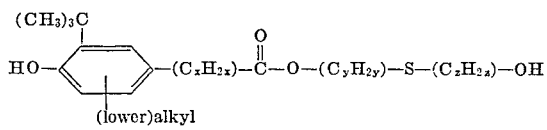

III

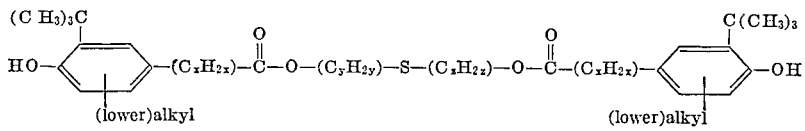

IV

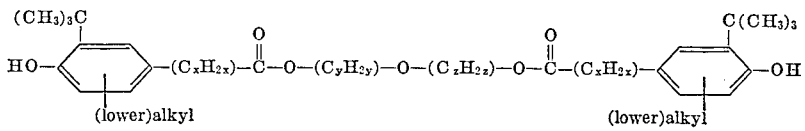

V

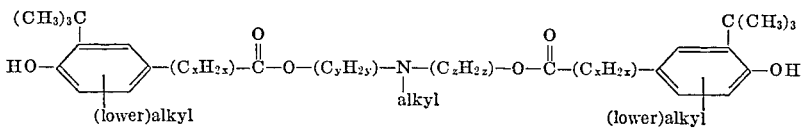

VI

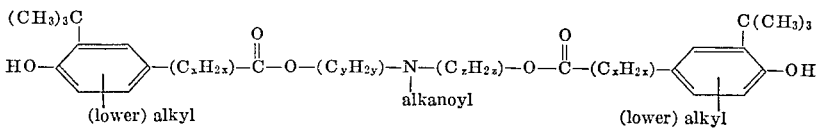
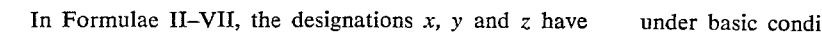

VII

In Formulae II–VII, the designations $x$, $y$ and $z$ have values as respectively defined in Formula I. Particularly preferred are those compounds of Formulae II–VII wherein the "(lower)alkyl" groups are p-butyl groups in the position ortho to the phenolic hydroxy group.

By the term "alkyl" and derivations thereof such as "alkylene" or "alkanoyl" is intended when used herein a group containing a branched or straight chain hydrocarbon chain of from 1 to 20 carbon atoms inclusively. Representative of such alkyl groups are thus methyl, ethyl, propyl, butyl, t-butyl, octyl, decyl, dodecyl, tetradecyl, octadecyl eicosyl and the like.

When the term "alkyl" is herein qualified by the designation "(lower)," there is intended a branched or straight chain hydrocarbon of from 1 to about 6 carbon atoms.

It will be observed, that the di(lower)alkylphenolic moiety in Formula I exhibits at least one (lower)alkyl group in a position ortho to the hydroxy group. The other (lower)alkoxy group is either (a) in the other position ortho to the hydroxy group or (b) meta to the hydroxy group and para to the first (lower)alkyl group. Although not so limited, these (lower)alkyl groups are preferably branched groups such as t-butyl. Other arrangements, such as for example, a 3-t-butyl-5-methyl-p-phenolic moiety, are, however, clearly envisioned.

The compounds of the present invention may be prepared via usual esterification procedures from a suitable alcohol and an acid of the formula:

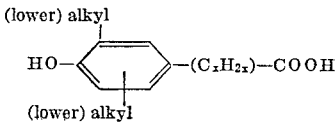

or an acid halide acid anhydride or mixed anhydride thereof.

Similarly the novel esters of this invention may be prepared by conventional methods of trans-esterification as well as by treatment of an acid of the formula:

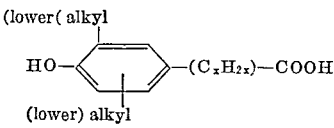

under basic conditions with a halogen compound of the formula:

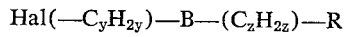

in which B, R, $y$ and $z$ are as defined above and Hal is a halogen atom, eg., chloro or bromo.

Stabilized compositions embracing the compounds of this invention, alone or in combination with other stabilizing materials, are more fully described in our copending application Ser. No. 164,618, filed Jan. 5, 1962, now abandoned.

The following examples, presented for illustration and not limitation, will further serve to typify the nature of the present invention. In these examples, parts are by weight unless otherwise specified and temperature is expressed in degrees centigrade. The relationship between parts by weight and parts by volume is as that of grams to cubic centimeters.

EXAMPLE 1

2-(n-octylthio)ethyl 3,5-di-t-butyl-4-hydroxybenzoate

To a solution of 7.5 parts of 3,5-di-t-butyl-4-hydroxybenzoic acid and 1.98 parts of potassium hydroxide in 50 parts by volume of methanol, is added a solution of 6.26 parts of 2-chloroethyl n-octyl sulfide in 30 parts by volume of methanol. The reaction mixture is stirred for 2 hours at 45° C. After cooling to room temperature, the reaction mixture is treated with 150 parts by volume of benzene and 200 parts of water. The aqueous layer is extracted with two portions of 75 parts by volume of benzene. The organic solutions are combined and washed successively with two portions of 100 parts of water, three portions of 75 parts of 1 N aqueous sodium hydroxide, two portions of 100 parts of water, two portions of 5% hydrochloric acid, two portions of 100 parts of water and two portions of saturated aqueous sodium chloride, all parts by volume. The benzene solution is then dried over anhydrous sodium sulfate. After filtering and evaporating the solvent, 10.2 parts (80%) of crude product are obtained. Distillation of the crude product yields 2 - (n-octylthio)ethyl 3,5-di-t-butyl-4-hydroxybenzoate, B.P. 206–208°/0.14 mm., refractive index $1.5128_D{}^{26.5}$.

Calc. for $C_{25}H_{42}O_3S$: C, 71.04; H, 10.02; S, 7.59. Found: C, 71.34; H, 10.10; S, 7.08.

EXAMPLE 2

2-(n-octylthio)ethyl 3,5-di-t-butyl-4-hydroxyphenylacetate

To a solution of 5.22 parts of 3,5-di-t-butyl-4-hydroxyphenylacetic acid and 1.31 parts of potassium hydroxide in 55 parts by volume of methanol is added at room temperature (25°) with stirring, a solution of 4.14 parts of 2-chloroethyl n-octyl sulfide in 20 parts by volume of methanol. The reaction mixture is stirred at 45°±3° for 3 hours. After cooling, the reaction mixture is diluted with 150 parts by volume of ether and 200 parts of water. After thoroughly mixing, the organic layer is separated and washed with three 100 part portions of water, four 100 part portions of saturated sodium bicarbonate, two 100 part portions of water, two 100 part portions of 5% hydrochloric acid, two 100 part portions of water and one 100 part portion of saturated sodium chloride solution. The washed ethereal solution is dried over anhydrous sodium sulfate and then filtered. The solvent is removed under reduced pressure, leaving a residue of 6.6 parts (76.5%) of 2 - (n-octylthio)ethyl 3,5 - di-t-butyl-4-hydroxyphenylacetate, B.P. 207°/0.07 mm., refractive index $1.508_D{}^{27.2}$.

Calc. for $C_{26}H_{44}O_3S$: C, 71.52; H, 10.16; S, 7.34. Found: C, 71.90; H, 9.73; S, 7.67.

EXAMPLE 3

2-(n-octadecylthio)ethyl 3,5-di-t-butyl-4-hydroxyphenylacetate

To a solution of 5.5 parts of 3,5-di-t-butyl-4-hydroxyphenylacetic acid and 1.38 parts of potassium hydroxide in 100 parts by volume of methanol, are added 7.27 parts of 2-chloroethyl n-octadecyl sulfide. The resulting mixture is warmed with stirring for six and a quarter hours at 50°±3°. After cooling to room temperature, 200 parts by volume of ether and 300 parts of water are added to the reaction mixture. The aqueous layer is extracted with two additional portions of 75 parts by volume of ether. The combined organic solutions are washed successively with two portions of 100 parts of water, three portions of 100 parts of saturated sodium bicarbonate solution, two portions of 100 parts of water, two portions of 100 parts 5% hydrochloric acid, two portions of 100 parts of water and one portion of 100 parts of saturated sodium chloride solution. The ethereal solution is then dried over anhydrous sodium sulfate. After removal of the drying agent, evaporation of the solvent under diminished pressure yields 9.5 parts (80%) of 2-(n-octadecylthio)ethyl 3,5-di-t-butyl-4-hydroxyphenylacetate, which is further purified by chromatography on alumina, employing hexane as the eluting solvent.

Calc. for $C_{26}H_{64}O_3S$: C, 74.94; H, 11.18; S, 5.56. Found: C, 75.48; H, 11.41; S, 6.11.

EXAMPLE 4

2-(n-octadecylthio)ethyl 3,5-di-t-butyl-4-hydroxybenzoate

By reacting 7.5 parts of 3,5-di-t-butyl-4-hydroxybenzoic acid, 1.98 parts of potassium hydroxide, 10.5 parts of 2-chloroethyl n-octadecyl sulfide in 100 parts by volume of methanol according to the procedure of Example 3, 2-(n-octadecylthio)ethyl 3,5-di-t-butyl-4-hydroxybenzoate, is obtained as a syrup.

Calc. for $C_{35}H_{62}O_3S$: C, 74.67; H, 11.10; S, 5.70. Found: C, 74.96; H, 11.07; S, 6.52.

EXAMPLE 5

2-(2-hydroxyethylthio)ethyl 3,5-di-t-butyl-4-hydroxybenzoate

A mixture consisting of 6.5 parts of methyl 3,5-di-t-butyl - 4 - hydroxybenzoate, 1.2 parts of bis(2-hydroxyethyl)sulfide and 0.108 part of sodium methylate is heated for 13 hours at 150–160° with occasional stirring. After cooling, the mixture is dissolved in 50 parts by volume of benzene and washed with four portions of 50 parts of water. After drying over anhydrous sodium sulfate, filtrating and evaporating the solution, 5.1 parts of crude product are obtained. Repeated crystallization from hexane yields the product 2-(2-hydroxyethylthio)ethyl 3,5-di-t-butyl-4-hydroxybenzoate, as a white solid of constant melting point 114–115° C.

Calc. for $C_{19}H_{30}O_4S$: C, 64.37; H, 8.53; S, 9.05. Found: C, 64.26; H, 8.74; S, 9.48.

EXAMPLE 6

β,β'-Thiodiethyl bis-(3,5-di-t-butyl-4-hydroxyphenylacetate)

β,β'-Dihydroxydiethyl sulfide (2.8 parts), 12.7 parts of methyl 3,5-di-t-butyl-4-hydroxyphenylacetate and 0.1 part of sodium methylate are melted together under nitrogen and heated at 130° for two and one half hours. The methanol thus formed is collected by the nitrogen sweep and condensed in a Dry-Ice trap. The reactants are heated at 65°/0.5 mm. for 3 hours and the content of the flask then dissolved in warm benzene and filtered, the benzene filtrate being washed three times with saturated sodium choride solution. The yellow filtrate is next dried over anhydrous sodium sulfate and the solvent exaporated under vacuum. β,β'-Thiodiethyl bis-(3,5-di-t-butyl-4-hydroxyphenylacetate) is isolated and purified by successive recrystallization from hexane and a mixture of hexane and t-butanol. The product is obtained as white crystals, M.P. 117–118° C.

Calc. for $C_{36}H_{54}O_6S$: C, 70.32; H, 8.86; S, 5.21. Found: C, 70.49; H, 9.07; S, 5.03.

EXAMPLE 7

Diethylene glycol bis-[3-(3,5-di-t-butyl-4-hydroxyphenyl)-propionate]

A mixture of 16.7 parts of 3-(3,5-di-t-butyl-4-hydroxyphenyl)-propionic acid, 2.65 parts of diethylene glycol, 2.5 parts of para-toluene sulfonic acid monohydrate, and 300 parts by volume of benzene are refluxed until no further water separates.

Upon cooling, the mixture is diluted with 200 parts by volume of benzene and washed successively with the following: water, 0.5 N sodium hydroxide, water and saturated aqueous sodium chloride. After drying over sodium sulfate an removing the solvent at reduced pressure, 14.3 parts of a syrupy residue remain. The product, diethylene glycol bis-[3-(3,5-di-t-butyl-4-hydroxyphenyl)-propionate], is purified by triturating with aqueous ethanol and then methanol, followed by recrystallizing once from each of these solvents in the order given. This yields the product with a constant melting point of 90–91° C.

Calc. for $C_{36}H_{56}O_7$: C, 72.80; H, 9.32; O, 17.86. Found: C, 72.62; H, 9.34; O, 18.18.

EXAMPLE 8

2-(n-octadecylthio)ethyl 3-(3,5-di-t-butyl-hydroxyphenyl)-propionate 2-hydroxyethyl n-octadecyl sulfide (8.26 parts) and 3.03 parts of triethylamine are dissolved in 75 parts by volume of dry benzene and 8.91 parts of 3-(3,5-di-t-butyl-4-hydroxyphenyl)-propionyl chloride dissolved in 100 parts by volume of dry benzene are added dropwise over a period of 10 minutes at 25–30° C. The reaction mixture is then heated for 3 hours and filtered. The filtrate is washed once with saturated sodium chloride solution, twice with 2 N aqueous sodium carbonate solution and then once again with saturated sodium chloride solution. After drying over sodium sulfate, the solvent is removed under reduced pressure to yield a syrup which is purified as a hexane solution by chromatography over alumina. Removal of the hexane then yields a syrup which crystallizes to yield the product, M.P. 45–47° C.

EXAMPLE 9

Thio-bis[ethylene 3-(3,5-di-t-butyl-4-hydroxyphenyl)-propionate]

Bis-(2-hydroxyethyl)sulfide (3.05 parts) and 6.06 parts of triethylamine are dissolved in 150 parts by volume of dry benzene and 17.8 parts of 3-(3,5-di-t-butyl-4-hydroxyphenyl)-propionyl chloride dissolved in 200 parts by volume of dry benzene are added and heated as in Example 8. The resulting benzene solution is filtered, dried and evaporated as therein described and the residue dissolved in hexane and purified by percolating through alumina (neutral, activity III). Removal of the solvent yields the product, thio - bis-[ethylene 3-(3,5-di-t-butyl-4-hydroxyphenyl)-propionate] as an oil which is soluble in hydrocarbons and gives the following analysis.

Calc. for $C_{38}H_{56}O_6S$: C, 70.98; H, 9.09; S, 4.98. Found: C, 70.88; H, 9.18; S, 5.28.

EXAMPLE 10

Stearamido N,N-bis-[ethylene 3-(3,5-di-t-butyl-4-hydroxyphenyl)-propionate]

N,N-di-(2-hydroxyethyl)-stearamide (9.28 parts) and 12.1 parts of triethylamine are dissolved in 200 parts by volume of dry benzene and 17.8 parts of 3-(3,5-di-t-butyl-4-hydroxyphenyl)-propionyl chloride, in 200 parts by volume of dry benzene, are added dropwise over a period of 2.5 hours while gently cooling the reaction vessel. The reactants are stirred at room temperature overnight. Nine parts of triethylamine hydrochloride are removed by filtration. After drying over sodium sulfate, the benzene solution is filtered and stripped of solvent to yield 16.6 parts of stearamido N,N-bis-[ethylene 3-(3,5-di-t-butyl-4-hydroxyphenyl)-propionate]. Further purification is achieved by chromatography over 320 parts of silica gel. After washing the column with benzene, the product is eluted with chloroform. Removal of the solvent yields the product as a hydrocarbon-soluble oil.

Calc. for $C_{56}H_{93}O_7N$: N, 1.57. Found: N, 1.58.

EXAMPLE 11 n-Butylimino N;N-bis-[ethylene 3-(3,5-di-t-butyl-4-hydroxyphenyl)-propionate]

N-n-butyldiethanolamine (4.03 parts) and 12.1 parts of triethylamine are dissolved in 150 parts by volume of dry benzene and 17.8 parts of 3-(,5-di-t-butyl-4-hydroxyphenyl)-propionyl chloride dissolved in 200 parts by volume of dry benzene are added and treated as described in Example 8. There is thus obtained as a syrup 21.7 parts of n-butylimino N,N - bis - [ethylene 3-(3,5-di-t-butyl-4-hydroxyphenyl)propionate] which is purified by chromatography over alumina (neutral, activity III) employing a 3:1 by volume mixture of hexanebenzene as eluant. Removal of the solvent yields the product as an oil which is soluble in hydrocarbons and gives the following analysis:

Calc. for $C_{42}H_{67}O_6N$: C, 73.97; H, 9.90; N, 2.05. Found: C, 73,54; H, 9.99; N, 2.14.

EXAMPLE 12

2-(2-stearoyloxyethylthio)-ethyl 3,4-di-t-butyl-4-hydroxybenzoate

To a solution of 35.45 g. (0.10 mole) of 2-(2-hydroxyethylthio)ethyl 3,5-di-t-butyl-4-hydroxybenzoate in 20.2 g. (0.20 mole) of triethylamine and 300 ml. of dry benzene is added at room temperature with stirring a solution of 30.29 g. (0.10 mole) of stearoyl chloride in 200 ml. of dry benzene. The resulting mixture is stirred at room temperature overnight and the solid which thus forms is removed by filtration and washed several times with benzene. The combined filtrate and benzene washings are washed successively with water, 0.5 N sodium hydroxide and saturated aqueous sodium chloride solution. After drying over sodium sulfate and removing the solvent under reduced pressure, there is obtained the desired product, the 2-(2-stearoyloxyethylthio)-ethanol ester of 3,5-di-t-butyl-4-hydroxybenzoic acid.

EXAMPLE 13

2-(2-hydroxyethylthio)-ethyl 7-(3-methyl-5-t-butyl-4-hydroxyphenyl)-heptanoate

To a cooled (—5° C.) solution of 103 g. (0.50 mole) of ethyl 6-(chloroformyl) hexanoate in 100 ml. of ethylene chloride is rapidly added with stirring 133 g. (1.0 mole) of granular anhydrous aluminum chloride. To this mixture is next added a solution of 88 g. (0.55 mole) of 2-methyl-6-t-butylphenol in 500 ml. of ethylene chloride. The reaction mixture is stirred at —5° C. for 5 hours and then allowed to slowly attain room temperature overnight. At the end of this time, the material is poured over ice, acidified with 6 N hydrochloric acid and extracted with ether. The combined extracts are successively washed with water, dilute aqueous sodium bicarbonate solution and saturated aqueous sodium chloride solution. After drying over sodium sulfate, the solvent is removed under reduced pressure to yield ethyl 6-(3-methyl-5-t-butyl-4-hydroxybenzoyl)-hexanoate which is saponified with an excess of potassium hydroxide in methanol. After acidification of the reaction mixture, the solid comprising 5-(3-methyl-5-t-butyl-4-hydroxybenzoyl)-hexanoic acid is subjected to a Clemmenson reduction as modified by Martin [J.A.C.S., 58, 1438 (1936)] to yield 7-(3-methyl-5-t-butyl-4-hydroxyphenyl)-heptanoic acid which is esterified in acidic methanol. After removing excess methanol, the resulting methyl ester is transesterified according to the procedure of Example 5 to yield 2-(2-hydroxyethylthio)-ethyl 7-(3-methyl-5-t-butyl-4-hydroxyphenyl)-heptanoate.

By treating this compound with stearoyl chloride according to the procedure of Example 12 there is obtained 2-(2-stearoyloxyethylthio)-ethyl 7-(3-methyl-5-t-butyl-4-hydroxyphenyl)-heptanoate.

What is claimed is:
1. A compound of the formula:

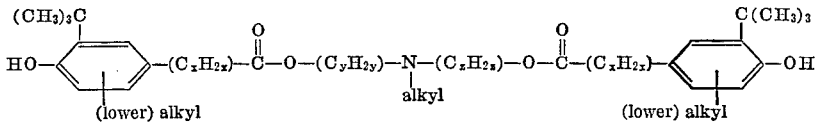

wherein x has a value of from 0 to 6 inclusively and each of y and z has a value of from 2 to 20 inclusively.

2. n-Butylimino N,N-bis-[ethylene 3-(3-,5 di-t-butyl-4-hydroxyphenyl)-propionate].

References Cited

UNITED STATES PATENTS 3,285,855   11/1966   Dexter et al. _____ 260—473 X
2,170,996   8/1939    Grether et al. _____ 260—473 X LORRAINE A. WEINBERGER, Primary Examiner D. STENZEL, Assistant Examiner

PO-1050
(5/69)

UNITED STATES PATENT OFFICE
CERTIFICATE OF CORRECTION

Patent No. 3,494,887   Dated February 10, 1970

Inventor(s) Martin Dexter, John D. Spivack, David H. Steinberg

It is certified that error appears in the above-identified patent and that said Letters Patent are hereby corrected as shown below:

Column 3 - Line 5   structure '$(CyH_2v)$' should be -- $(CyH_2y)$ --.

Column 3 - ' 59   'alkoxy group' should be --alkyl group--.

Column 5 - ' 33   '$1.508_D$' should be -- $1.5085_D^{27.2}$ --.

Column 6 - ' 33   'exaporated' should be --evaporated--.

Column 6 - ' 54   'an' should read --and--.

Column 6 - ' 62   '$C_{36}H_{56}O_7$' should be -- $C_{38}H_{58}O_7$ --.

Column 7 - ' 25   '$C_{38}H_{56}O_6S$' should be -- $C_{38}H_{58}O_6S$ --.

Column 7 - ' 55   '3-(,5 di-t-)' should be --3-(3,5 di-t-)--.

Column 7 - ' 74   '3,4-di' should be --3,5-di--.

SIGNED AND SEALED
NOV 10 1970

(SEAL)
Attest:

Edward M. Fletcher, Jr.
Attesting Officer

WILLIAM E. SCHUYLER, JR.
Commissioner of Patents